Feb. 6, 1962 A. F. MURTY ETAL 3,020,094
SAFETY BRAKE MECHANISM FOR VEHICLE
Filed Sept. 11, 1959 4 Sheets-Sheet 1

INVENTORS
ANTHONY F. MURTY
BENEDICT P. MURTY
BY
Buckhorn and Cheatham
ATTORNEYS

INVENTORS
ANTHONY F. MURTY
BENEDICT P. MURTY
BY
Buckhorn and Cheatham
ATTORNEYS

United States Patent Office 3,020,094
Patented Feb. 6, 1962

3,020,094
SAFETY BRAKE MECHANISM FOR VEHICLE
Anthony F. Murty and Benedict P. Murty, Portland, Oreg., assignors to Bendix-Westinghouse Automotive Air Brake Company, a corporation of Delaware
Filed Sept. 11, 1959, Ser. No. 839,464
20 Claims. (Cl. 303—9)

This application is a continuation-in-part of our copending application, Serial No. 747,104, filed July 1, 1958, now abandoned, which in turn was a continuation-in-part of and copending with our application, Serial No. 576,860, filed April 9, 1956, and now abandoned.

Our present invention comprises an improvement in brake operating mechanism for vehicles such as trucks, trailers, buses and the like. The principal object of the present invention is to provide a brake operating system of the pneumatic type which will "fail safely," and in which the possibility of any mechanical failure of the brake applying apparatus resulting in an accident is reduced to a minimum.

Embodied in the foregoing object of the invention is the object of providing a brake system in which it is necessary for an operator to be in the driver's position behind the steering wheel, or at least in close proximity to the steering wheel where he may assume command of the vehicle quickly, in order that the brakes of a parked vehicle may be released. Also embodied in the principal object of the invention is the object of providing an air brake system in which the brakes will be applied to bring the vehicle to a stop and hold it in arrested position if for any reason the air pressure in the system should drop below a predetermined minimum, such as forty-five pounds per square inch, or other minimum pressure as may be determined by safety regulation agencies, while the vehicle is in movement. Also embodied in the object of the invention is the object of providing auxiliary brake applying means of a mechanical nature which will apply the brakes independently of the pneumatic system if for any reason the air supply should drop below the predetermined minimum.

The objects and advantages of the present invention will be more readily understood by reference to the accompanying drawings taken in connection with the following specification wherein like numerals refer to like parts throughout.

Figure 1:
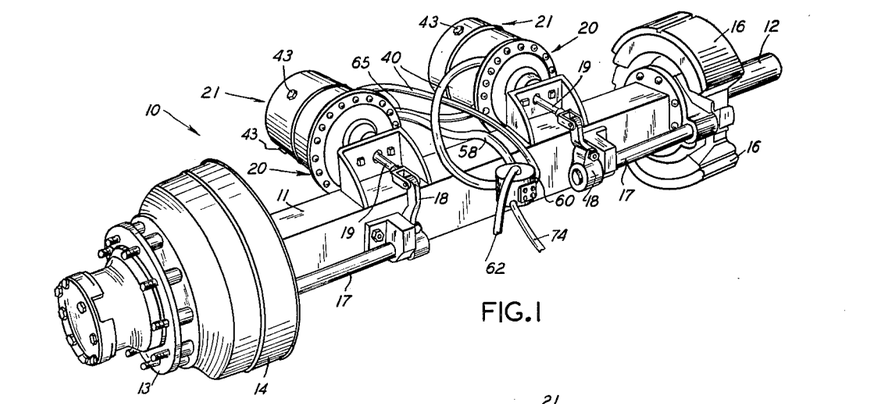
FIG. 1 is a view in perspective of a wheel mounting assembly for a trailer, having brake actuators and safety devices of the present invention applied thereto.

While the present invention is herein illustrated in FIG. 1 as being applied to a trailer wheel mounting assembly 10, it is to be appreciated that the present invention can be applied to a driven axle assembly or any other assembly embodying a brake.

The device of FIG. 1 comprises a frame 11 mounting a pair of spindles 12 which support wheel mounting hubs 13. Each hub is provided with the usual brake drum 14 inside of which are a pair of brake shoes 16 actuated through conventional rock shafts 17. Each rock shaft is independently rocked by a crank 18 and a pivotally connected brake actuator rod 19 extending from a pressure chamber assembly 20 mounted upon a bracket affixed to the frame 11. The safety device of FIGS. 1 to 5 comprises a second pressure chamber assembly 21 mounted upon the brake actuator pressure chamber assembly 20.

Figures 2, 3:
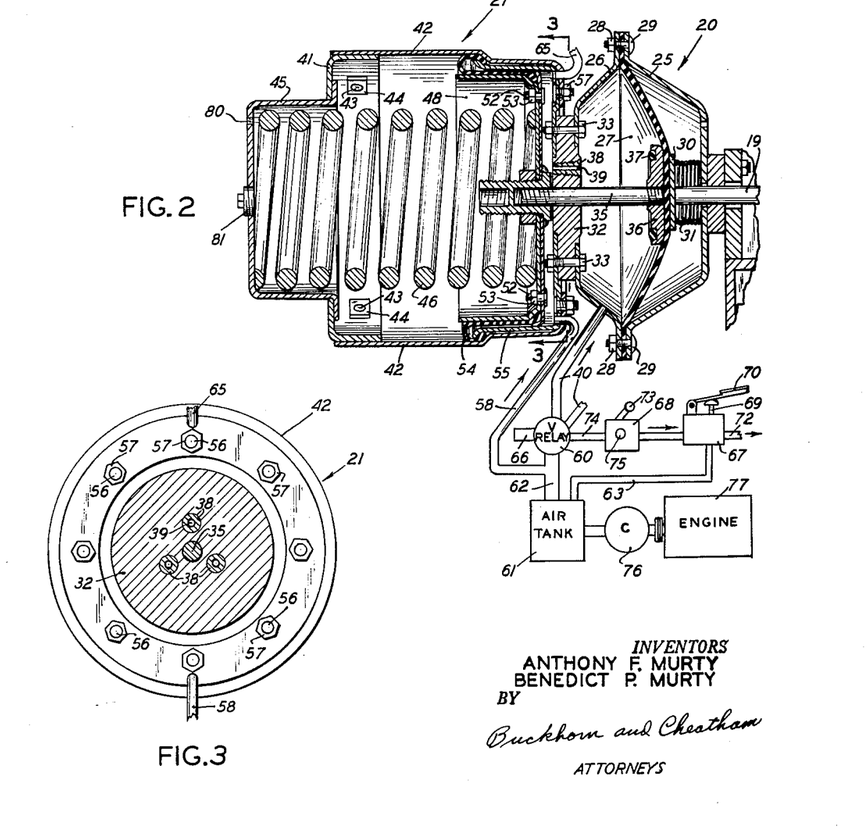
FIG. 2 is a longitudinal, axial section through one of the brake actuators and safety devices of the present invention in the condition in which it would be if there were insufficient air pressure, and as a result the brake applied, in connection with a schematic diagram of the air supply and air control system.
FIG. 3 is a vertical section taken substantially along line 3—3 of FIG. 2.

The brake actuator assembly 20 comprises a pair of dished members 25 and 26 provided with aligned rims between which is clamped the periphery of an impervious, flexible diaphragm 27 by means of a plurality of bolts 29 and nuts 28. The space between member 25 and diaphragm 27 is conveniently vented to the atmosphere. The brake actuator rod 19 extends thereinto and is provided with a head 30 which engages the central portion of the diaphragm, and a releasing spring 31 is compressed between the member 25 and the head 30, the spring always tending to retract the rod 19 to the position shown in FIG. 5 and thus release the brake. The member 26 is provided with a large central opening across which is fitted a thick plate 32 in airtight relation to the member 26, the same being retained by bolts 33 and nuts 34. The plate 32 is provided with a central opening which slidably guides a push rod 35 having an enlarged head 36 on the end thereof within the brake actuator. An annular sealing ring 37 is mounted in the head 36 on the side thereof facing the plate 32, the same being adapted to seat in airtight engagement with a valve seat on the surface of the plate. A plurality of metering plugs 38 are threadedly mounted in the plate 32, the plugs providing bleed orifices 39 lying within the ambit of the sealing ring 37 so that when the sealing ring is seated the actuator space between the member 26 and the diaphragm 27 is sealed from the safety device 21. When the push rod head is thus seated, the actuator space may be supplied with air under pressure or exhausted through an air supply hose 40. The plugs 38 are threaded so that they may be interchangeably replaced with plugs having different sizes of orifices therethrough in order to vary the rate of passage of air from one chamber to the other when the push rod is unseated. The escape of air from the safety device to the actuator is permitted at a slow rate when head 36 is unseated.

The safety device assembly 21 comprises a separable housing including two members 41 and 42 which are held together in overlapping relation by suitable means such as studs 43, the inner ends of which are received in nuts 44 welded to the wall of the member 41. The member 41 has an inwardly turned annular flange which engages the outwardly turned annular flange of a spring retainer cup 45 forming the outer end of the housing and in which is seated a heavy compression spring 46.

The inner end of the spring 46 bears against piston means comprising a cup-shaped diaphragm guide 48 which is provided with a central opening through which extends an elongated, tubular, outwardly threaded push rod anchor 49. The outer end of the member 49 is welded to a disk-shaped diaphragm clamp plate 50 which has a downwardly turned rim overlying a peripheral groove in the edge of the diaphragm guide 48 at the juncture of its bottom and side walls. The push rod anchor and diaphragm clamp are retained against the surface of the bottom of the diaphragm guide by a clamp nut 51 threaded onto the stem of the anchor, and by a plurality of peripherally disposed bolts 52 and nuts 53. One end edge of a rolling diaphragm sleeve 54 is clamped between the downwardly turned edge of the plate 50 and the groove on the guide 48, the edge of the rolling diaphragm having a bead thereon to insure clamping engagement of the diaphragm and guide. The other end edge of the diaphragm 54 is provided with a similar bead which is clamped between the outwardly turned rim of a cup-shaped, rolling diaphragm clamp 55 and a shoulder on the member 42, the members 42 and 55 being held in clamping engagement by a plurality of bolts 56 and nuts 57. The space between the rolling diaphragm guide 48 and the plate 32 is thereby formed into an expansible chamber into which air may be supplied under pressure through an air supply tube 58, or exhausted therefrom through the bleed ports 39.

Figure 4:
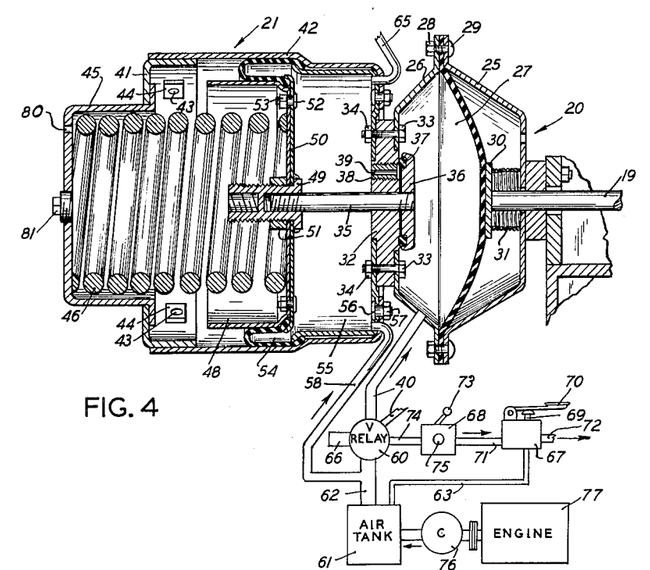
FIG. 4 is a view similar to FIG. 2 showing the safety mechanism in battery position and the brake applied.
Figure 5:
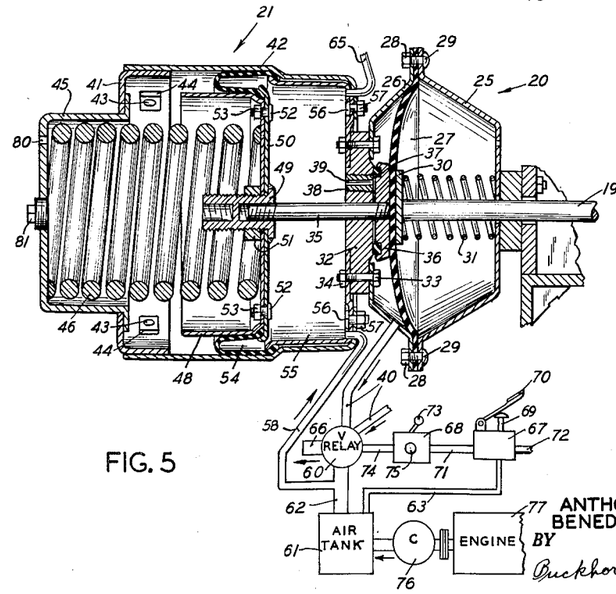
FIG. 5 is a similar view showing the safety mechanism in battery position and the brake released.

While there may be different arrangements of hoses and valves leading to the device of the present invention, the essentials of all such arrangements are illustrated schematically in FIGS. 2, 4 and 5. A portion of an operating system for a trailer is likewise illustrated in detail in FIG. 1. In FIG. 1 it is seen that a pair of air supply hoses 40 lead from the body of a pneumatic relay valve 60 mounted on the side of the housing 11, one such hose leading to each of the brake applying devices 20. The relay valve is connected to a source of air under pressure such as an air reservoir tank 61 through a main air supply hose 62. Details of the relay valve 60 are not herein illustrated, the same being conventional. It is sufficient for the present invention to state that, when the relay valve is open, air is supplied under pressure to the brake actuators 20. Air under pressure is constantly applied to the safety devices 21 through a hose 58 leading to one and a second hose 65 leading from it to the other. The relay valve is so arranged that hoses 40 and 58 are all connected to the supply tank when the relay valve is open and its exhaust port 66 closed, but when the relay valve is closed and exhaust or discharge port 66 open only hoses 40 are vented while hose 58 remains in communication with tank 61. The relay valve is opened by a spring (not shown) and closed by a pneumatic piston (not shown) which overcomes the spring.

When the relay valve 60 is closed the brake actuator chambers are exhausted through the hoses 40 and the relay valve exhaust port as schematically indicated in FIG. 5. Opening and closing of the relay valve is accomplished through a control system including a hose 63 leading from the supply tank 61 to a foot valve 67 which is connected in series with a manual valve 68 and the relay valve 60. The foot valve is provided with an actuating plunger 69 which is normally held in elevated position by a spring (not shown) and which may be depressed by a brake pedal 70. When the plunger 69 is elevated, air may flow from the tank through the valve 67, and when it is depressed, the passage of air into the valve 67 is stopped and air may be exhausted from the hose 71 leading to the relay valve through an exhaust port indicated schematically at 72. Similarly the valve 68 is so arranged that when the manual lever 73 thereof is in the position illustrated air may be supplied through pipe 71, through the valve 68, and hose 74 leading to the relay valve 60, and an exhaust port 75 on the valve 68 is closed. When the lever 73 is thrown to its opposite position the supply of air from hose 71 is shut off and air may be exhausted from the relay valve through exhaust port 75. The air tank 61 is supplied with air from the usual compressor 76 driven by the engine 77. When the pedal is depressed the spring in relay valve 60 opens the relay valve so that the brakes are applied. The space surrounding spring 46 is vented to the atmosphere through an opening 80 in member 45. Member 45 is also provided with a central, threaded opening which is normally closed by a plug 81. The plug 81 may be removed to permit insertion of a threaded rod into the internally threaded end of anchor 49, such a rod (not shown) being part of a tool to hold spring 46 in compression in order that the device may be disassembled for servicing.

*Operation*

The operation of the system is illustrated in FIGS. 2, 4 and 5. The mechanism disclosed in FIG. 2 shows the relationship of parts when there is no, or insufficient, air pressure in the system, and the brake has been mechanically applied by the safety device. It has been arbitrarily determined that a minimum pressure of forty-five pounds per square inch is desirable for air operated brakes, and the compressor normally delivers more than that, generally in the order of one hundred and ten pounds per square inch. The safety device operates if the pressure should fall to about forty-five pounds per square inch, in which case there would be insufficient pressure to hold the spring 46 compressed. Thereupon the push rod head 36 would be released from sealing engagement, thus opening the bleed ports 39 and permitting air to escape from the safety device into the actuator assembly. The tendency of spring 31 to release the brakes due to low pressure would be overcome by the head of the push rod 36 engaging the diaphragm and pushing the actuator rod 19 toward brake setting position. The spring 46 is designed fully to extend the push rod when the pressure is at or about forty-five pounds per square inch, which is still sufficient pressure to hold the brake diaphragm in brake closing position, so that the brakes of a parked vehicle would not even be momentarily released. Thereafter it would not matter whether the pressure dropped to zero or not, the brakes would remain set.

In order for the operator to release the brakes when the safety device has operated there must be over forty-five pounds pressure in the system, since the safety device must be set in "battery" position to release the brakes. In order to do this the operator must hold the brake pedal 70 depressed, or move the manual brake control lever 73 to the left, and thus open the relay valve 60 and close the exhaust port 66 of the relay valve. If there is insufficient pressure and running of the motor is incapable of building up sufficient pressure, the operator cannot release the brakes until repairs have been effected. If there is sufficient pressure in the system, the relay valve exhaust port 66 will be closed, whereupon air of sufficient pressure can flow through hose 58 to the safety devices and hoses 40 to the brake actuators as indicated by the arrows in FIG. 2. The application of forty-five pounds of air pressure in both spaces holds the brakes in set condition and collapses the spring 46 until the sealing ring 37 is seated against the plate 32. In this position the two chambers are separated from each other and will remain so as long as the pressure remains above the desired minimum.

FIG. 4 illustrates the operation of the brake during normal operation of the vehicle, with the safety device maintained in battery position. In order to apply the brakes the operator usually depresses the foot treadle which opens the relay valve to permit air to enter the brake actuator chamber to apply the brakes, as indicated by the arrows in FIG. 4. As soon as the foot treadle is released, the relay valve is closed and its exhaust vent 66 opened, permitting the spring 31 to release the brakes and cause air to be exhausted from the air brake chamber as indicated by the arrows in FIG. 5. Regardless of the operation of the foot treadle (or the operation of the manual lever 73) the safety device remains in battery position and the brakes can be applied or released in the normal fashion.

The hoses leading from the air tank to the relay valve and to the control valve 67 and 68 are normally quite lengthy, particularly in a tractor-trailer arrangement, and may be hidden in relatively inaccessible portions of the frame. Also, there are coupling between a truck and a trailer which may fail or separate. Another source of mechanical failure of an air brake system is failure of the compressor properly to compress air, and another is deterioration or seam failure of the air pressure tank. In the present invention any failure in any hose line, the couplings, the control valves, the compressor or the air tank is a "safe" failure during operation. Such a failure would result in loss of pressure in the safety chamber and application of the brakes by the spring 46. Even if there were a break in the hose 58, the result would be the same since air would flow directly to the atmosphere instead of passing through the valve 60 and exhaust port 66. The worst thing that could happen during operation of the vehicle would be to have a complete break in hose 58 or 65 which might cause relatively rapid escape of air from the safety devices and fairly rapid application of the brakes. This however, would be better than having the vehicle continue operation with a defective brake system.

Figure 6:
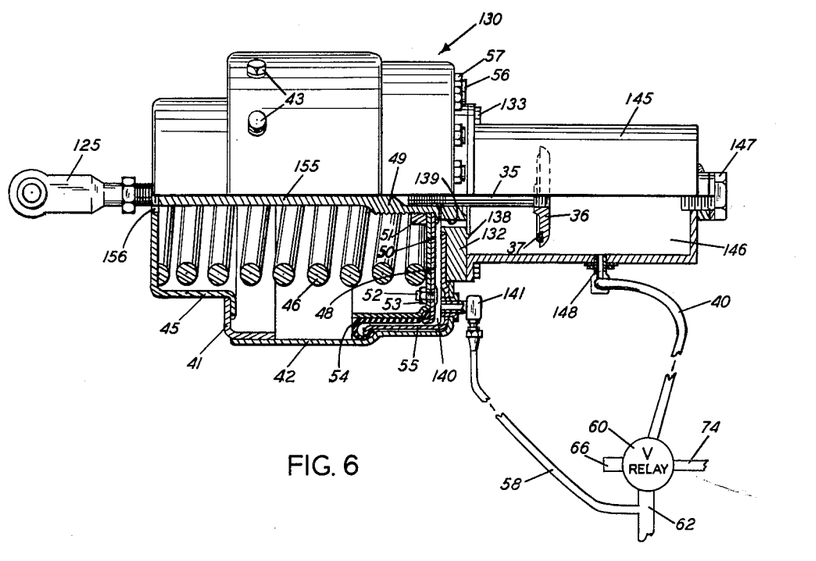
FIG. 6 is a combined side elevation and central section of a modified form brake actuator and safety device of the present invention in the condition in which it would be if there were insufficient air pressure, and as a result the brake applied, corresponding to FIG. 2.
Figure 7:
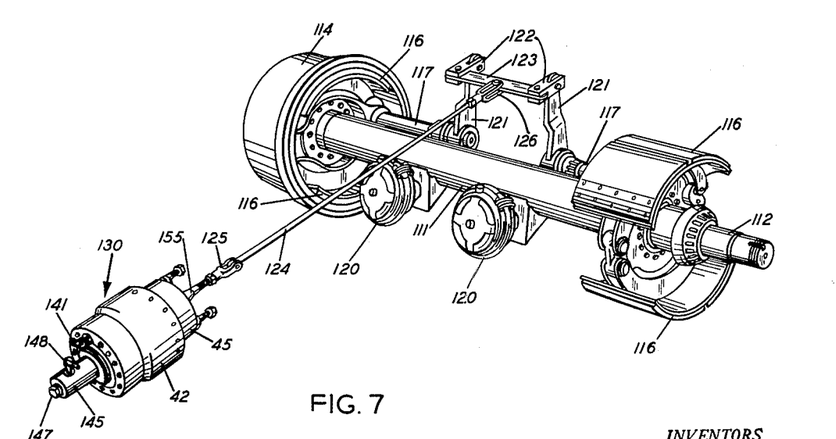
FIG. 7 is a view in perspective of the device of FIG. 6 applied to a typical brake assembly.

*Modification of FIGS. 6 and 7*

This modification of FIGS. 6 and 7 embodies exactly the same principles, and almost all of the same parts, in an arrangement whereby the safety device operates the brakes through a pulling link rather than through a push rod. This arrangement permits employment of the normal brake actuator assemblies without modification thereof, the safety actuator being mounted independently somewhere on the vehicle frame and connected to the rock shaft of the brake assembly through a separate crank arm which rotates the rock shaft in the same direction that it would be rotated by the normal brake actuators.

A typical installation is illustrated in FIG. 7 wherein the assembly comprises a frame 111 mounting a pair of spindles 112 which support wheel mounting hubs including the usual brake drums 114, inside of which there are a pair of brake shoes 116 actuated through conventional rock shafts 117. Each rock shaft is independently rocked by a downwardly extending crank (not shown) pivotally connected to the usual brake actuator rod (not shown) extending from a brake actuator pressure chamber assembly 120 mounted on the frame 111. The assembly 120 is the conventional brake actuator including a diaphragm (not shown) actuated in the conventional manner. Each rock shaft 117 is provided with an upwardly extending crank 121 to which there is pivotally connected a rearwardly extending block 122, between which there is pivotally connected an equalizer link 123. A pull rod 124 extends longitudinally from a clevis 125, forming a part of the safety brake actuator, and is connected centrally to the equalizer 123 through a lost motion clevis 126. If the brakes are actuated in the normal manner through the brake actuators 120, the cranks 121 may rock forwardly without having any effect upon the pull rod 124 by reason of the lost motion connector 126. However, if the normal actuators 120 should fail the safety brake actuator 130 of the present invention will take over and actuate the brakes as previously described.

The modified form of safety brake actuator illustrated in FIG. 6 comprises a large number of the same parts previously described, as follows: The assembly comprises a separable housing including two members 41 and 42 which are held together in overlapping relation by suitable means such as studs 43. The member 41 has an inwardly turned annular flange which engages the outwardly turned annular flange of a spring retainer cup 45 forming the outer end of the housing and seating a heavy compression spring 46.

The inner end of the compression spring 46 bears against piston means, comprising a cup shaped diaphragm guide 48 which is provided with a central opening through which extends an elongated, tubular, outwardly threaded anchor 49. The outer end of the anchor 49 is welded to a disk-shaped diaphragm clamp plate 50 which has a downwardly turned rim overlying a peripheral groove in the diaphragm guide 48 at the juncture of its bottom and side walls. The anchor and diaphragm clamp are retained against the surface of the bottom of the diaphragm guide by a clamping nut 51 threaded onto the stem of the anchor, and by a plurality of peripherally disposed bolts 52 and nuts 53. One end edge of a rolling diaphragm sleeve 54 is clamped between the downwardly turned edge of the member 50 and the groove of the member 48, said edge of the diaphragm sleeve having a bead thereon to insure clamping engagement of the diaphragm and its guide. The other end edge of the diaphragm sleeve 54 is provided with a similar bead which is clamped between the outwardly turned rim of a cup-shaped, rolling diaphragm clamp 55 and a shoulder on the member 42, the members 42 and 55 being held in clamping engagement by a plurality of bolts 56 and nuts 57.

The bottom of the member 55 extends inwardly beyond the inwardly turned flange of the member 42, and is provided with a large central aperture into which there is fitted a central boss on a plate 132, the two being fastened together in airtight relation by a plurality of bolts 133. The plate 132 is provided with a central opening which slidably guides a rod 35 having its end threadedly engaged in the internally threaded end of the member 49. The rod 35 has an enlarged valve head 36 on its outer end which seats an annular sealing ring 37 adapted to engage an annular valve seat 138 on the plate 132 surrounding a plurality of orifices 139 through plate 132, the orifices permitting the flow of air from the space 140 between the plate 132 and the piston member when air is admitted thereto through an air supply inlet 141 (FIG. 7), corresponding to inlet tube 58 of FIG. 2. When the valve head 36 is seated against the plate 132 the orifices 139 are closed thereby.

As previously described, the safety device comprises a pair of coaxially aligned pressure chamber assemblies, one of said chambers being an expansible chamber for releasing the mechanically applied brakes, such chamber being provided by the members forming the space 140. In this modification the brake actuator chamber 20 is replaced by a second pressure chamber assembly including a cup-shaped member 145 provided with a flange which is engaged by the bolts 133 so as to hold the cup-shaped member in sealed engagement with the plate 132, the member 145 providing an enclosed space 146 in which the valve 36 is contained. The other end of the member 145 is provided with an opening in which there is normally mounted a plug 147 sealing the opening. The plug may be removed in order to insert a manually actuated tool or the like by means of which the valve head 36 may be moved toward the plate 132, compressing the spring 46. The side of the member 145 is provided with a nipple 148 into which is connected the tube 40 leading from the relay valve 60 and air pressure system as previously explained in connection with the first modification. Relay valve 60 is representative of any controllable air exhausting valve and may be termed a vent valve.

The anchor member 49 comprises the inner end of a rod 155 which extends rearwardly through an opening 156 in the bottom of the member 45, the end thereof being threadedly connected to the clevis 125 which is pivotally connected to the pull rod 124.

The operation of this modification is identical with the operation of the previous modification except that when pressure is relieved within the chamber 140 below the designed minimum, the spring 46 actuates the piston to pull the brakes closed rather than push them closed. The mechanism disclosed in FIG. 6 shows the relationship of parts when there is no, or insufficient, air pressure in the system and the brakes have been mechanically applied by the safety device.

In order for the operator to release the brakes after the safety device has operated there must be over forty-five pounds pressure in the system, since the safety device must be set in "battery" position to release the brakes. In order to do this the operator must hold the usual brake pedal or control lever in proper position as previously described, and a control system such as schematically illustrated in connection with FIG. 2 will function as previously described. When the safety device is in battery position the brakes can be applied or released in the normal manner through actuation of the normal brake actuators 120. Any reduction in pressure within chamber 140 below the designed minimum results in application of the brakes by the safety device.

The members defining the space 140 enclosing the rolling sleeve diaphragm 54 may be conveniently described as a cylinder chamber enclosing piston means.

Figure 8:
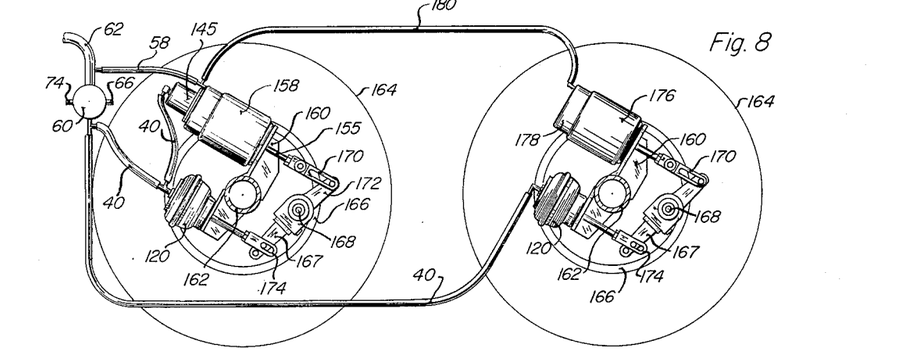
FIG. 8 is a partly diagrammatic view of a modification showing one manner of applying a master safety device and a slave safety device in accordance with the invention to different axles of a vehicle.

The modification of FIG. 8 employs a safety device 158 which may be similar in structure to the safety device 130 of FIGS. 6 and 7, but is shown as being mounted directly upon a bracket 160 secured to a tubular axle 162 upon which a wheel 164 is journaled and which supports a brake drum 166. The bracket 160 also supports a conventional fluid pressure brake actuator 120 which may be of the same type as the actuators 120 of FIG. 7. The actuator is connected to a lever arm 167 on a brake shaft 168 and can rotate the brake shaft 168 in a counterclockwise direction from the position shown in FIG. 8 to apply the brake. The safety device 158 is shown in the battery position so that the brake associated therewith is released. A lost motion connection 170 between the pull rod 155 of the safety device and another lever arm 172 on the shaft 168 enables the actuator 120 to apply the brake without moving the pull rod 155 and similarly a lost motion connection 174 allows the safety device 158 to mechanically apply the brake without interference bf the actuator 120.

Figure 10:
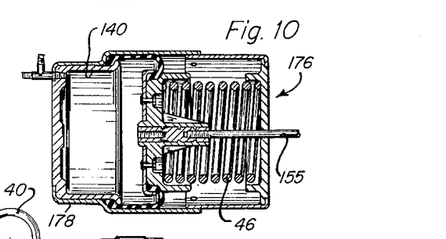
FIG. 10 is a longitudinal cross section taken centrally through the slave safety devices of FIGS. 8 and 9.

The safety device 158 of FIG. 8 is shown as being emloyed as a master safety device to control a slave safety device 176 shown most clearly in FIG. 10. The slave safety device may have the same structure as the safety device 158 or the safety device 130 of FIG. 6, except that the member 145 forming the chamber 146 along with the valve plate 36 and rod 35, which are the same elements shown in FIG. 6, are omitted and an imperforate end portion 178 is employed for the safety device 176. The slave safety device 176 is mounted upon a bracket 160 on another axle 162 and cooperates with another fluid pressure brake actuator 120 in the same manner as the safety device 158.

The expansible chambers 140 of the two safety devices 158 and 176 are connected by a constantly open conduit 180 so that the pressures in the two chambers are always the same and the brake applying springs 46 and piston areas of the two safety devices are such that they simultaneously operate to release the brakes on the two axles, or to simultaneously mechanically apply such brakes. It will be apparent that the number of slave safety devices is not limited to one and that a single master safety device may be employed to control all of the other safety devices on the various axles of a vehicle. The master safety device 158 may have its expansible chamber connected through a conduit 58 to the source of air under pressure and may be controlled from a relay valve 60. The valve 60 may be the same as the valve 60 in FIG. 6 of the drawing and may be controlled and be connected to the master safety device through a conduit 40 in the same manner as the relay valve 60 of such figure.

Figure 9:
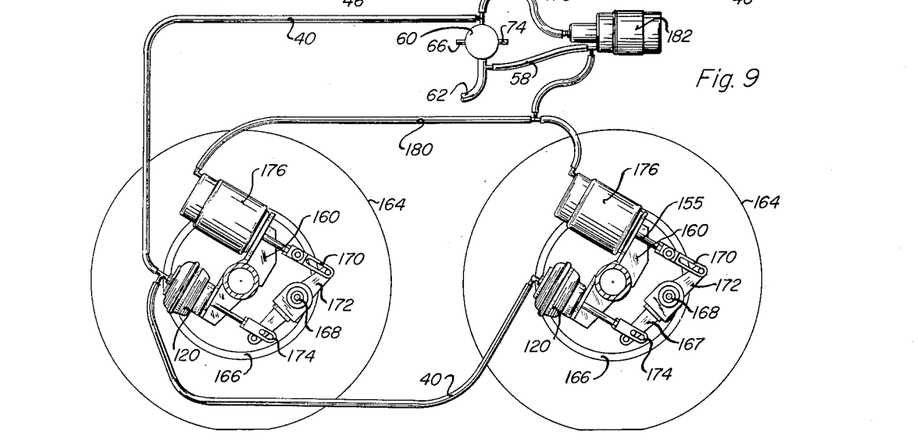
FIG. 9 is a view similar to FIG. 8 showing another modification in which a master safety valve is employed with two slave safety devices of the present invention.
Figure 11:
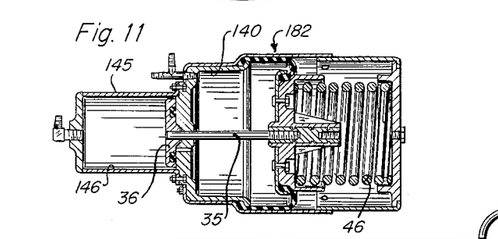
FIG. 11 is a longitudinal cross section taken centrally through the master safety valve of FIG. 9.

As shown in FIG. 9, all of the safety devices may be slave safety devices 176 and such slave safety devices may be controlled by a master safety valve 182, the details of which are shown most clearly in FIG. 11. Such safety valve may be similar in structure to the master safety device 158 of FIG. 8 or the safety device of FIG. 6, except that the pull rod 155 is omitted and no brake is released or mechanically applied directly by the safety valve. Such safety valve 182 may have its expansion chamber 140 connected through a conduit 58 to a source of air under pressure and be controlled from a relay valve 60 in the same manner as the master safety device of FIG. 8 or the safety devices of the other figures of the drawing are controlled from similar valves 60.

The safety valve 182 need not be of the same physical size as the safety devices 176 as long as the ratio of the spring force of its spring 46 to the effective piston area of its expansible chamber 140 is substantially the same as that of the slave safety devices 176. Such safety valve may thus be smaller in size than the safety devices 176 and may be mounted at any convenient location on the vehicle.

It will be apparent that the reduction of air pressure below a predetermined value either by a deliberate act of the operator to set the brakes when leaving the vehicle or accidentally such as by the breakage of any air conduit in the systems of any of the modifications of the invention will produce a mechanical application of the brakes of the vehicle. While a definite predetermined pressure of 45 p.s.i. has been discussed by way of example, it will be understood that any suitable predetermined pressure may be selected. After any such a mechanical application the brakes may be released only after an actuation of a manually actuated element, which actuation must be a deliberate act of the operator. This requires the presence of the operator in the cab and insures that a thorough test of the air brake system must be made before the vehicle can be moved. It will be understood that in releasing a mechanical application by actuation of the brake pedal, fluid pressure is conducted to the service brake actuator as the spring in the safety device is compressed. Hence, as the mechanical brake application is released a fluid pressure brake application is simultaneously effected, thus avoiding any possibility of combining a mechanical and a fluid pressure brake application which would subject the brake operating levers and linkages to excessive forces. The operation of the various systems is such that the mechanical application of the brakes by the safety device always moves the brakes from their fully on position to their fully off position or vice versa and there is no possibility of a floating or partial application of such brakes by the safety device.

Having illustrated and described preferred embodiments of the present invention, it should be apparent to those skilled in the art that the invention permits of other modifications in arrangement and detail. We claim as our invention all such modifications as come within the true spirit and scope of the appended claims.

We claim:

1. A safety device effective in the event of fluid pressure failure for mechanically setting a brake which is normally set by a fluid pressure brake actuator comprising means forming a pair of chambers, one of which constitutes a cylinder, said means including a plate separating said chambers, a piston in said cylinder chamber movable toward and away from said plate, a safety spring urging said piston toward said plate, a valve stem fixed to said piston and extending through said plate into the other of said chambers, said plate having a bleed orifice therethrough, a valve head on said valve stem, said valve head closing said bleed orifice upon movement of said piston away from said plate to compress said safety spring, a source of pressure fluid, means connecting said cylinder chamber with said pressure fluid source to admit pressure fluid to said cylinder chamber in order to move said piston away from said plate and compress said safety spring, a vent valve normally venting said other chamber whereby pressure fluid admitted to said one chamber when said bleed orifice is open may escape through said vent valve, closing of said vent valve resulting in the building up of pressure in said cylinder chamber with resulting movement of said piston away from said plate to compress said safety spring, the movement of the piston resulting in corresponding movement of said valve head to close said bleed orifice, the closing of said bleed orifice permitting said vent valve thereafter to be opened without resulting in return of said piston as long as sufficient fluid pressure is maintained in said cylinder chamber to overcome said safety spring, and mechanical brake setting means movable by said piston to brake setting position upon loss of fluid pressure in said cylinder chamber to an extent such that said safety spring returns said piston toward said plate.

2. A safety device effective in the event of fluid pressure failure for mechanically setting a brake which is normally set by a fluid pressure brake actuator comprising means forming a pair of chambers, one of which constitutes a cylinder, said means including a plate separating said chambers, a piston in said cylinder chamber movable toward and away from said plate, a safety spring urging said piston toward said plate, a valve stem coaxially fixed to said piston and extending through said plate into the other of said chambers, said plate having a bleed orifice therethrough, a valve head on said valve stem, said valve head closing said bleed orifice upon movement of said piston away from said plate to compress said safety spring, a source of pressure fluid, means connecting said cylinder chamber with said pressure fluid source to admit pressure fluid to said cylinder chamber in order to move said piston away from said plate and compress said safety spring, a vent valve normally venting said other chamber whereby pressure fluid admitted to said one chamber when said bleed orifice is open may escape through said vent valve, closing of said vent valve resulting in the building up of pressure in said cylinder chamber with resulting movement of said piston away from said plate to compress said safety spring, the movement of the piston resulting in corresponding movement of said valve head to close said bleed orifice, the closing of said bleed orifice permitting said vent valve thereafter to be opened without resulting in return of said piston as long as sufficient fluid pressure is maintained in said cylinder to overcome said safety spring, and mechanical brake setting means movable by said piston to brake setting position upon loss of fluid pressure in said cylinder chamber to an extent such that said safety spring returns said piston toward said plate, said mechanical brake setting means comprising a brake rod coaxially attached to said piston and extending therefrom in the direction opposite to said valve stem.

3. A safety device effective in the event of fluid pressure failure for mechanically setting a brake which is normally set by a fluid pressure brake actuator comprising means forming a pair of chambers, one of which constitutes a cylinder, said means including a plate separating said chambers, a piston in said cylinder chamber movable toward and away from said plate, a safety spring urging said piston toward said plate, a valve stem coaxially fixed to said piston and extending through said plate into the other of said chambers, said plate having a bleed orifice therethrough, a valve head on said valve stem, said valve head closing said bleed orifice upon movement of said piston away from said plate to compress said safety spring, a source of pressure fluid, means connecting said cylinder chamber with said pressure fluid source to admit pressure fluid to said cylinder chamber in order to move said piston away from said plate and compress said safety spring, a vent valve normally venting said other chamber whereby pressure fluid admitted to said one chamber when said bleed orifice is open may escape through said vent valve, closing of said vent valve resulting in the building up of pressure in said cylinder chamber with resulting movement of said piston away from said plate to compress said safety spring, the movement of the piston resulting in corresponding movement of said valve head to close said bleed orifice, the closing of said bleed orifice permitting said vent valve thereafter to be opened without resulting in return of said piston as long as sufficient fluid pressure is maintained in said cylinder chamber to overcome said safety spring, and mechanical brake setting means movable by said piston to brake setting position upon loss of fluid pressure in said cylinder chamber to an extent such that said safety spring returns said piston toward said plate, said mechanical brake setting means comprising a brake setting rod coaxially arranged with respect to said valve stem.

4. Brake controlling mechanism comprising a pair of pressure chamber forming assemblies mounted in coaxial alignment and including a plate forming a common wall separating one pressure chamber from the other, one of said assemblies comprising a brake actuator including a housing and a pressure actuated diaphragm, a brake actuator rod movable axially by said diaphragm toward brake setting position upon the application of sufficient fluid pressure to said brake actuator, and a brake releasing spring opposing the action of said diaphragm for returning said brake actuator rod to brake releasing position upon the release of fluid pressure from said brake actuator, the other of said assemblies comprising a safety device including a housing and piston means movable in the axial direction of said brake actuator rod away from said plate upon the application of sufficient fluid pressure to said safety device, a safety spring opposing the action of said piston means for returning said piston means toward said plate upon release of fluid pressure from said safety device, a push rod mounted on said piston means and extending axially through said plate in alignment with said brake actuator rod, and a valve head on said push rod, said plate having bleed orifice means therethrough positioned to be closed by said valve head when said safety spring is compressed, said push rod being separate from said diaphragm to permit independent movement of said diaphragm and said brake actuator rod as long as said safety spring is held under compression, and said safety spring being stronger than said brake releasing spring whereby said brake actuator rod is held in brake setting position by said push rod and safety spring whenever the fluid pressure in said safety device drops below a predetermined minimum.

5. The construction set forth in claim 4 in which said piston means comprises a cup-shaped guide member, a rolling diaphragm sleeve, means clamping one end of said rolling diaphragm sleeve to said guide member, and means clamping the other end of said rolling diaphragm sleeve to the housing of said safety device.

6. The construction set forth in claim 4 in which said safety device housing comprises a pair of overlapping cylindrical members surrounding said safety spring, threaded means holding said members together, and a threaded anchor on said piston means whereby means may be employed to hold said safety spring under compression to permit safe disassembly of said safety device.

7. The construction set forth in claim 4 in which said bleed orifice means comprises a plug threadedly mounted in said plate and having an orifice therethrough.

8. Brake controlling mechanism comprising a pair of pressure chamber forming assemblies mounted in coaxial alignment and including a plate forming a common wall separating one pressure chamber from the other, one of said assemblies comprising a brake actuator including a housing and a pressure actuated diaphragm, a brake actuator rod movable axially by said diaphragm toward brake setting position upon the application of sufficient fluid pressure to said brake actuator, and a brake releasing spring opposing the action of said diaphragm for returning said brake actuator rod to brake releasing position upon the release of fluid pressure from said brake actuator, the other of said assemblies comprising a safety device including a housing and piston means movable in the axial direction of said brake actuator rod away from said plate upon the application of sufficient fluid pressure to said safety device, a safety spring opposing the action of said piston means for returning said piston means toward said plate upon release of fluid pressure from said safety device, a push rod mounted on said piston means and extending axially through said plate in alignment with said brake actuator rod, and a valve head on said push rod, said plate having bleed orifice means therethrough positioned to be closed by said valve head when said safety spring is compressed, said push rod being separate from said diaphragm to permit independent movement of said diaphragm and said brake actuator rod as long as said safety spring is held under compression, and said safety spring being stronger than said brake releasing spring whereby said brake actuator rod is held in brake setting position by said push rod and safety spring whenever the fluid pressure in said safety device drops below a predetermined minimum, a common source of fluid pressure for said pressure assemblies, means connecting said source of pressure to said safety device, and means including valve means for alternately connecting said source of pressure to said brake actuator to set the brake or disconnecting said source of pressure from said brake actuator and exhausting said brake actuator to release the brake when said safety spring is held under compression.

9. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge means for discharge of said fluid from said chamber to maintain the fluid pressure in said chamber below said predetermined pressure during said discharge, means including manually controlled valve means for preventing said discharge and for increasing the fluid pressure in said chamber above said predetermined pressure to expand said chamber when the fluid from said source is supplied to said actuator and is at a pressure above said predetermined pressure, and second valve means operable to prevent said discharge when said chamber is expanded to thereby maintain the fluid pressure in said chamber above said predetermined pressure as long as the fluid from said source remains at a pressure above said predetermined pressure.

10. Brake safety mechanism for a vehicle effective in the event of failure of fluid pressure from a source of said presure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge means between said chamber and said actuator and from said actuator to the atmosphere for discharge of said fluid from said chamber to maintain the fluid pressure in said chamber below said predetermined pressure during said discharge, means including manually controlled valve means for supplying fluid from said source to said actuator and to simultaneously prevent said discharge to thereby increase the fluid pressure in said chamber above said predetermined pressure and expand said chamber when the fluid from said source is at a pressure above said predetermined pressure, and second valve means operable to prevent said discharge when said chamber is expanded to thereby maintain the fluid pressure in said chamber above said predetermined pressure as long as the fluid from said source remains at a pressure above said predetermined pressure.

11. Brake safety mechanism for a vehicle effective in the event of failure of fluid pressure from a source of said pressure to mechanically apply a brake in a system in which a brake is normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying a brake independently of said actuator when the fluid pressure in said chamber is below a predetermined pressure, said mechanism having a discharge means for discharge of said fluid from said chamber to maintain the fluid pressure in said chamber below said predetermined pressure during said discharge, means including manually controlled valve means for supplying fluid from said source to said actuator and for simultaneously preventing said discharge to thereby increase the fluid pressure in said chamber above said predetermined pressure and expand said chamber when the fluid from said source is at a pressure above said predetermined pressure, and second valve means operable to prevent said discharge when said chamber is expanded to thereby maintain the fluid pressure in said chamber above said predetermined pressure as long as the fluid from said source remains at a pressure above said predetermined pressure.

12. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge port for discharge of said fluid from said chamber to prevent build-up of pressure in said chamber to a value above said predetermined pressure, means including manually initiated means for preventing said discharge of fluid pressure from the chamber and for increasing the fluid pressure in said chamber above said predetermined pressure to expand the chamber when the fluid from said source is at a pressure above said predetermined pressure and for maintaining the fluid pressure in said chamber at a value above said predetermined pressure as long as the fluid from said source remains at a pressure above said predetermined pressure, the last named means including a valve member movable to a closed position for preventing said discharge, and said valve member including a part subjected to fluid pressure from said source to maintain said valve member in closed position so long as the fluid from said source remains at a pressure above said predetermined pressure.

13. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge port for discharge of said fluid from said chamber to prevent build-up of pressure in said chamber to a value above said predetermined pressure, means including manually controlled valve means for preventing said discharge of fluid pressure from the chamber and for increasing the fluid pressure in said chamber above said predetermined pressure to expand the chamber when the fluid from said source is at a pressure above said predetermined pressure and means for maintaining the fluid pressure in said chamber at a value above said predetermined pressure as long as the fluid from said source remains at a pressure above said predetermined pressure, the last named means including a part subjected to fluid pressure from said source.

14. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge port connecting said chamber to the atmosphere, means for closing said discharge port and effecting an increase in the fluid pressure in said chamber above said predetermined pressure to expand the chamber when the fluid from said source is at a pressure above said predetermined pressure and for maintaining the fluid pressure in said chamber at a value above said predetermined pressure as long as the fluid from said source remains at a pressure above said predetermined pressure, said means including a pair of separate valves arranged in series in the connection between said chamber and said discharge port, means including a manually operable member for operating one of said valves to close said discharge port, and a pressure responsive member connected to the other of said valves and subjected to the pressure from said source when said discharge port is closed to close said other valve and to maintain said other valve in closed position so long as the fluid from said source remains at a pressure above said predetermined pressure.

15. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge means for connecting said chamber to the atmosphere, means including a manually operable valve for closing said discharge means and effecting an increase in the fluid pressure in said chamber above said predetermined pressure to expand the chamber when the fluid from said source is at a pressure above said predetermined pressure, and means for maintaining the fluid pressure in said chamber at a value above said predetermined pressure as long as the fluid from said source remains at a pressure above said predetermined pressure, said last named means including a part subjected to fluid pressure from said source.

16. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge port connecting said chamber to the atmosphere, means for closing said discharge port and effecting an increase in the fluid pressure in said chamber above said predetermined pressure to expand the chamber when the fluid from said source is at a pressure above said predetermined pressure and for maintaining the fluid pressure in said chamber at a value above said predetermined pressure as long as the fluid from said source remains at a pressure above said predetermined pressure, said means including a pair of separate valves arranged in series in the connection between said chamber and said discharge port, means including a manually operable member for operating one of said valves to close said discharge port, and a pressure responsive part connected with the other of said valves and subjected to the pressure from said source when said other valve is closed to maintain said other valve closed so long as the fluid from said source remains at a pressure above said predetermined pressure.

17. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge port for connecting said chamber to the atmosphere, means including a manually operable valve for supplying fluid from said source to said actuator and chamber and for simultaneously effecting a brake application and closing said discharge port to effect an increase in the fluid pressure in said chamber above said predetermined pressure and expand the chamber when the fluid from said source is at a pressure above said predetermined pressure, and means for maintaining the fluid pressure in said chamber at a value above said predetermined pressure as long as the fluid from said source remains at a pressure above said predetermined pressure, said last named means including a part subjected to fluid pressure from said source.

18. Brake safety mechanism for a vehicle effective in the event of failure of fluid pressure from a source of said pressure to mechanically apply a brake normally applied by supplying fluid under pressure from said source to a fluid pressure brake actuator, said mechanism comprising an expansible chamber, conduit means for supplying fluid from said source to said chamber, and resilient means for preventing expansion of said chamber and for mechanically applying said brake when the fluid pressure in said chamber is below a predetermined pressure, said mechanism having a discharge port connecting said chamber to the atmosphere, means for supplying fluid from said source to said actuator and chamber for simultaneously effecting a brake application and closing said discharge port to effect an increase in the fluid pressure in said chamber above said predetermined pressure and expand the chamber when the fluid from said source is at a pressure above said predetermined pressure, and means for maintaining the fluid pressure in said chamber at a value above said predetermined pressure as long as the fluid from said source remains at a pressure above said predetermined pressure, said last two means including a pair of separate valves arranged in series in the connection between said chamber and said discharge port, means including a manually operable member for operating one of said valves to supply fluid from said source to said actuator and to simultaneously close said discharge port, and a pressure responsive part connected with the other of said valves and subjected to the pressure from said source when said other valve is closed to maintain said other valve closed so long as the fluid from said source remains at a pressure above said predetermined pressure.

19. Brake safety mechanism for a vehicle effective in the event of failure of fluid pressure from a source of said pressure to apply a brake in a system in which a brake is normally applied by supplying fluid under pressure from said source to a fluid pressure brake actuator, said mechanism comprising an expansible chamber, conduit means for supplying fluid from said source to said chamber, and means including a spring for preventing expansion of said chamber and for effecting the application of the brake when the fluid pressure in said chamber is below a predetermined pressure, said mechanism having a discharge means for discharge of said fluid from said chamber to maintain the fluid pressure in said chamber below said predetermined pressure during said discharge, means including manually controlled valve means for preventing said discharge and for supplying fluid from said source to said chamber to thereby increase the fluid pressure in said chamber above said predetermined pressure and expand said chamber when the fluid from said source is at a pressure above said predetermined pressure, and second valve means operable to prevent said discharge when said chamber is expanded to thereby maintain the fluid pressure in said chamber above said predetermined pressure as long as the fluid from said source remains at a pressure above said predetermined pressure.

20. Brake safety mechanism for a vehicle effective in the event of failure of fluid pressure from a source of said pressure to apply a brake normally applied by supplying fluid under pressure from said source to a fluid pressure brake actuator, said mechanism comprising an expansible chamber, conduit means for supplying fluid from said source to said chamber, and means including a spring for preventing expansion of said chamber and for effecting the application of said brake when the fluid pressure in said chamber is below a predetermined pressure, said mechanism having a discharge port connecting said chamber to the atmosphere, means for closing said discharge port and for supplying fluid from said source to said chamber and for simultaneously effecting an increase in the fluid pressure in said chamber above said predetermined pressure to expand the chamber when the fluid from said source is at a pressure above said predetermined pressure, and means for maintaining the fluid pressure in said chamber at a value above said predetermined pressure as long as the fluid from said source remains at a pressure above said predetermined pressure, said last two means including a pair of separate valves arranged in series in the connection between said chamber and said discharge port, means including a manually operable member for operating one of said valves to supply fluid from said source to said chamber and to simultaneously close said discharge port, and a pressure responsive part connected with the other of said valves and subjected to the pressure from said source when said other valve is closed to maintain said other valve closed so long as the fluid from said source remains at a pressure above said predetermined pressure.

References Cited in the file of this patent

UNITED STATES PATENTS

| | | |
|---|---|---|
| 2,282,615 | Spalding | May 12, 1942 |
| 2,754,805 | Beman | July 17, 1956 |